US006934498B2

(12) United States Patent
Kobayashi et al.

(10) Patent No.: US 6,934,498 B2
(45) Date of Patent: Aug. 23, 2005

(54) COLOR IMAGE FORMING APPARATUS, TANDEM TYPE COLOR IMAGE FORMING APPARATUS, AND PROCESS CARTRIDGE FOR COLOR IMAGE FORMING APPARATUS

(75) Inventors: Kazuhiko Kobayashi, Tokyo (JP); Tetsuo Yamanaka, Tokyo (JP); Hiroyasu Shijo, Tokyo (JP)

(73) Assignee: Ricoh Company, Limited, Tokyo (JP)

(*) Notice: Subject to any disclaimer, the term of this patent is extended or adjusted under 35 U.S.C. 154(b) by 14 days.

(21) Appl. No.: 10/668,156

(22) Filed: Sep. 24, 2003

(65) Prior Publication Data

US 2004/0109708 A1 Jun. 10, 2004

(30) Foreign Application Priority Data

Sep. 24, 2002 (JP) .......................................... 2002-276746
Sep. 24, 2002 (JP) .......................................... 2002-276747
Aug. 28, 2003 (JP) .......................................... 2003-305293

(51) Int. Cl.[7] ......................... G03G 15/01; B41J 2/385; G01D 15/06
(52) U.S. Cl. ....................................... 399/301; 347/116
(58) Field of Search .......................... 399/66, 298, 301, 399/303, 312, 313; 347/115, 116

(56) References Cited

U.S. PATENT DOCUMENTS

| | | | | |
|---|---|---|---|---|
| 5,486,909 A | | 1/1996 | Takenaka et al. | |
| 5,489,747 A | | 2/1996 | Takenaka et al. | |
| 5,617,191 A | | 4/1997 | Murakami et al. | |
| 5,625,440 A | | 4/1997 | Matsumae et al. | |
| 5,666,625 A | | 9/1997 | Komatsubara et al. | |
| 5,689,782 A | | 11/1997 | Murakami et al. | |
| 5,697,026 A | | 12/1997 | Matsumae et al. | |
| 5,717,981 A | | 2/1998 | Yamanaka | |
| 5,768,665 A | | 6/1998 | Yamanaka et al. | |
| 5,826,144 A | | 10/1998 | Takenaka et al. | |
| 5,879,752 A | | 3/1999 | Murakami et al. | |
| 5,897,243 A | | 4/1999 | Komatsubara et al. | |
| 5,930,561 A | | 7/1999 | Hosokawa et al. | |
| 6,033,818 A | | 3/2000 | Sugiyama et al. | |
| 6,163,666 A | | 12/2000 | Hosokawa et al. | |
| 6,167,221 A | | 12/2000 | Kobayashi | |
| 6,212,343 B1 | | 4/2001 | Hosokawa et al. | |
| 6,321,060 B1 | * | 11/2001 | Nakayasu et al. | 399/301 |
| 6,336,024 B1 | * | 1/2002 | Kanaya et al. | 399/301 |
| 6,381,435 B2 | * | 4/2002 | Shinohara et al. | 399/301 |
| 6,393,244 B1 | * | 5/2002 | Nakayasu et al. | 399/301 |
| 6,567,643 B2 | | 5/2003 | Yasui et al. | |
| 6,619,209 B2 | * | 9/2003 | Dreher et al. | 347/116 X |
| 6,661,981 B2 | * | 12/2003 | Boothe et al. | 399/301 X |

FOREIGN PATENT DOCUMENTS

| | | |
|---|---|---|
| JP | 63-226167 | 10/1987 |
| JP | 8-234531 | 9/1996 |
| JP | 2002-207338 | 7/2002 |

* cited by examiner

*Primary Examiner*—Sandra L. Brase
(74) *Attorney, Agent, or Firm*—Oblon, Spivak, McClelland, Maier & Neustadt, P.C.

(57) ABSTRACT

A mark pattern forming unit forms a mark pattern on a transfer belt, and a reflection type optical sensor detects the mark pattern. An interval difference acquiring unit acquires an interval difference that is a deviation of each mark from a reference position. A speed detector detects a moving speed v1 of the transfer belt in a period between formation of the mark pattern and the detection of the mark pattern, and a moving speed v2 during image formation. A speed difference calculating unit calculates a speed difference Δv=v1−v2, and a control unit controls a timing of forming an image based on the interval difference and the value of Δv so as to reduce position misalignment.

19 Claims, 14 Drawing Sheets

COLOR IMAGE FORMING APPARATUS, TANDEM TYPE COLOR IMAGE FORMING APPARATUS, AND PROCESS CARTRIDGE FOR COLOR IMAGE FORMING APPARATUS

BACKGROUND OF THE INVENTION

1) Field of the Invention

The present invention relates to a technology for preventing position misalignment for each color occurring upon transferring a color toner image.

2) Description of the Related Art

An image forming apparatus generally employs a transfer method that forms a latent image for each color, produces a toner image using a developing unit, and then transfers the toner image to a recording medium using a transferring unit. There are three popular transfer methods as follow:

1) Method of employing an intermediate transfer element, forming a color image on the intermediate transfer element from photosensitive elements, and transferring the color image to a recording medium (hereinafter "intermediate transfer method");
2) Method of conveying a recording medium on a transfer belt, and directly transferring toner images formed on the photosensitive elements to the recording medium in sequence (hereinafter "direct transfer method"); and
3) Method of combining the two above mentioned methods.

Currently, a high demand for printing color images calls for an increased need for the direct transfer method for balancing between printing cost and printing speed. However, a mechanism using the direct transfer method has a technological difficulty in position alignment between color images, which causes a faulty image to easily occur. Particularly, the position misalignment in each color at the time of image transfer is a technological problem to be solved.

In order to prevent the position misalignment, a couple of technologies were proposed. One of those technologies employs a color misalignment correcting unit that forms a plurality of mark patterns for each of colors arranged along a transfer belt, detects each of the marks by a sensor, and calculates a deviation amount of the mark from an ideal position to compensate for the deviation amount. The conventional technology is disclosed, for example, in Japanese Patent Application Laid Open No. 08-234531 and Patent Application Laid Open No. 2002-207338.

Japanese Patent Application Laid Open No. 62-226167 discloses a technology on a unit as follows. The unit detects marks previously formed on a transfer belt, calculates a moving speed of the transfer belt from a interval between the marks or detects a rotational speed at any part of a transfer belt drive system, feeds back the calculated moving speed or the detected rotational speed to a drive control circuit that controls to drive the transfer belt, and stabilizes the moving speed of the transfer belt (hereinafter, "belt speed correcting unit").

However, as explained in the technologies, even when a deviation amount of the mark pattern is detected to correct it, or even when the moving speed of the transfer belt is detected to detect a deviation amount of the mark pattern and the deviation amount is corrected, the position misalignment or color misalignment is still a problem in the color printing. Inventors of the present invention examined the cause of the problem, and have found that the moving speed of the transfer belt when the deviation amount of the mark pattern is detected, is different from the moving speed of the transfer belt when a transfer medium is conveyed on the transfer belt and an image is actually printed on the transfer medium.

SUMMARY OF THE INVENTION

It is an object of the present invention to solve at least the problems in the conventional technology.

The color image forming apparatus according to one aspect of the present invention includes an electrostatic charger, an image carrier that is charged by the electrostatic charger, an exposing unit that irradiates a light to the image carrier to form a latent image on the image carrier, a developing unit that develops the latent image with toner of a specific color to form a toner image of the specific color, a transfer belt that moves at a specific moving speed to feed the recording medium to the developing unit so that the toner image is transferred to the recording medium, a pattern forming unit that forms a mark pattern including a first mark and a second mark on the transfer belt using toner, a first sensor that detects the first mark and the second mark while the transfer belt is moving, an acquiring unit that acquires a current interval between the first mark and the second mark and calculates an interval difference between the current interval and a predetermined reference interval, a speed detector that detects a first moving speed that is a moving speed of the transfer belt during a period of time from formation of the mark pattern to detection of the mark pattern, and a second moving speed that is a moving speed of the transfer belt while transferring the toner image to the recording medium, a calculating unit that calculates a speed difference between the first moving speed and the second moving speed, and a control unit that controls image formation based on the interval difference and the speed difference.

The tandem type color image forming apparatus according to another aspect of the present invention includes a plurality of electrostatic chargers, a plurality of image carriers each of which is charged by a corresponding one of the electrostatic chargers, a plurality of exposing units each of which irradiates a light to a corresponding one of the image carriers to form a latent image on each of the image carriers, a plurality of developing units each of which develops the latent image on a corresponding one of the image carriers with toner of a specific color to form a toner image of the specific color, a transfer belt that moves at a specific moving speed to feed a recording medium to the developing unit so that the toner images are transferred to the recording medium, a pattern forming unit that forms a mark pattern including a first mark and a second mark on the transfer belt using toner, a first sensor that detects the first mark and the second mark while the transfer belt is moving, an acquiring unit that acquires a current interval between the first mark and the second mark and calculates an interval difference between the current interval and a predetermined reference interval, a speed detector that detects a first moving speed that is a moving speed of the transfer belt during a period of time from formation of the mark pattern to detection of the mark pattern, and a second moving speed that is a moving speed of the transfer belt while transferring the toner image to the recording medium, a calculating unit that calculates a speed difference between first moving speed and second moving speed, and a control unit that controls image formation based on the interval difference and the speed difference.

The process cartridge according to still another aspect of the present invention is detachably mounted to the color image forming apparatus that includes an electrostatic charger, an image carrier that is charged by the electrostatic charger, an exposing unit that irradiates a light to the image carrier to form a latent image on the image carrier, a developing unit that develops the latent image with toner of a specific color to form a toner image of the specific color, a transfer belt that has a speed mark previously formed, and moves at a specific moving speed to feed the recording medium to the developing unit so that the toner images are transferred to the recording medium, a cleaning unit that cleans the image carrier, a pattern forming unit that forms a mark pattern including a first mark and a second mark on the transfer belt using toner, a first sensor that detects the first mark and the second mark while the transfer belt is moving, an acquiring unit that acquires a current interval between the first mark and the second mark and calculates an interval difference between the current interval and a predetermined reference interval, a second sensor that detects the speed mark pattern on the transfer belt, a speed detector that detects a first moving speed that is a moving speed of the transfer belt during a period of time from formation of the mark pattern to detection of the mark pattern, and a second moving speed that is a moving speed of the transfer belt while transferring the toner image to the recording medium, a calculating unit that calculates a speed difference between the first moving speed and the second moving speed, and a control unit that controls a timing of forming the latent image on the image carrier based on the interval difference and the speed difference. The process cartridge is a combination of the image carrier with at least one from among the electrostatic charger, the developing unit, and the cleaning unit. An image is formed on a region of the image carrier that is out of overlapping with the mark pattern previously formed on the transfer belt.

The other objects, features and advantages of the present invention are specifically set forth in or will become apparent from the following detailed descriptions of the invention when read in conjunction with the accompanying drawings.

DETAILED DESCRIPTION

Exemplary embodiments of the color image forming apparatus, tandem type image forming apparatus, and the process cartridge used in the color image forming apparatus according to the present invention are explained in detail below with reference to the accompanying drawings.

The color image forming apparatus of the present invention is applied particularly to a tandem type image forming apparatus to allow alignment precision between colors, and a high quality image can be provided at a high speed. However, the application of the color image forming apparatus is not limited to the tandem type image forming apparatus, and the color image forming apparatus is also applicable to any image forming apparatus using an image forming method in such a manner that toner images are superposedly transferred.

Figure 1:
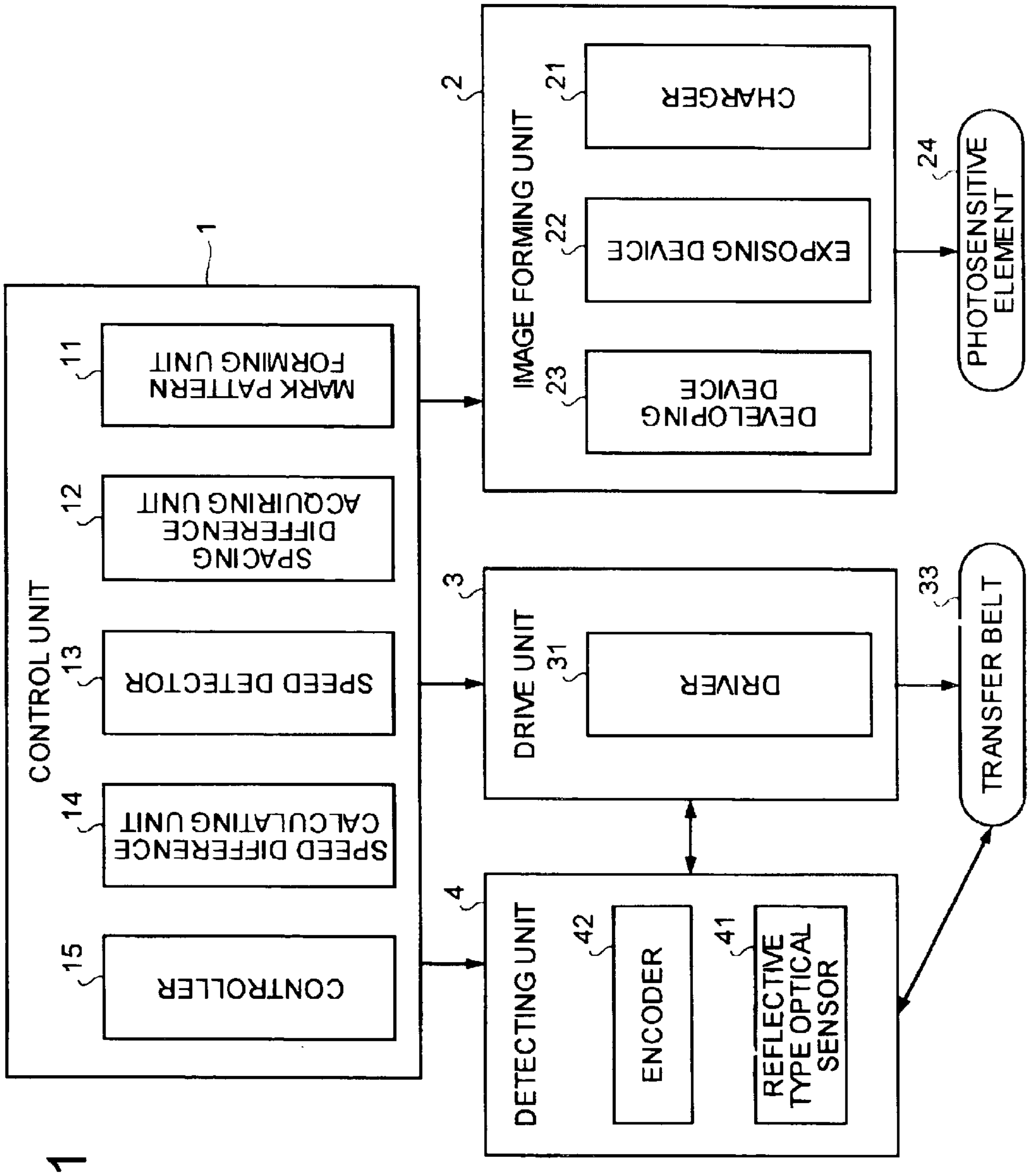
FIG. 1 is a block diagram of a color image forming apparatus according to a first embodiment of the present invention.

FIG. 1 is a block diagram of a color image forming apparatus according to a first embodiment of the present invention. The color image forming apparatus includes a control unit 1 that controls the whole process of image formation, an image forming unit 2 that performs image formation, a driving unit 3 that conveys a recording medium to the image forming unit 2, and a detecting unit 4 that detects operations of the image forming unit 2 and the driving unit 3.

The control unit 1 includes a mark pattern forming unit 11, an interval difference acquiring unit 12, a speed detector 13, a speed difference calculating unit 14, and a controller 15.

The image forming unit 2 includes a charger 21, an exposing device 22, a developing device 23, and a photosensitive element 24. The driving unit 3 includes a driver 31, a roller 50 and a transfer belt 33. The detecting unit 4 includes a reflection type optical sensor 41 and an encoder 42.

The mark pattern forming unit 11 controls the charger 21, the exposing device 22, and the photosensitive element 24 to form an electrostatic latent image for a mark pattern on the photosensitive element 24, and the developing device 23 forms the mark pattern on the transfer belt 33. The mark pattern is used to detect color misalignment in the image formation.

Figure 2:
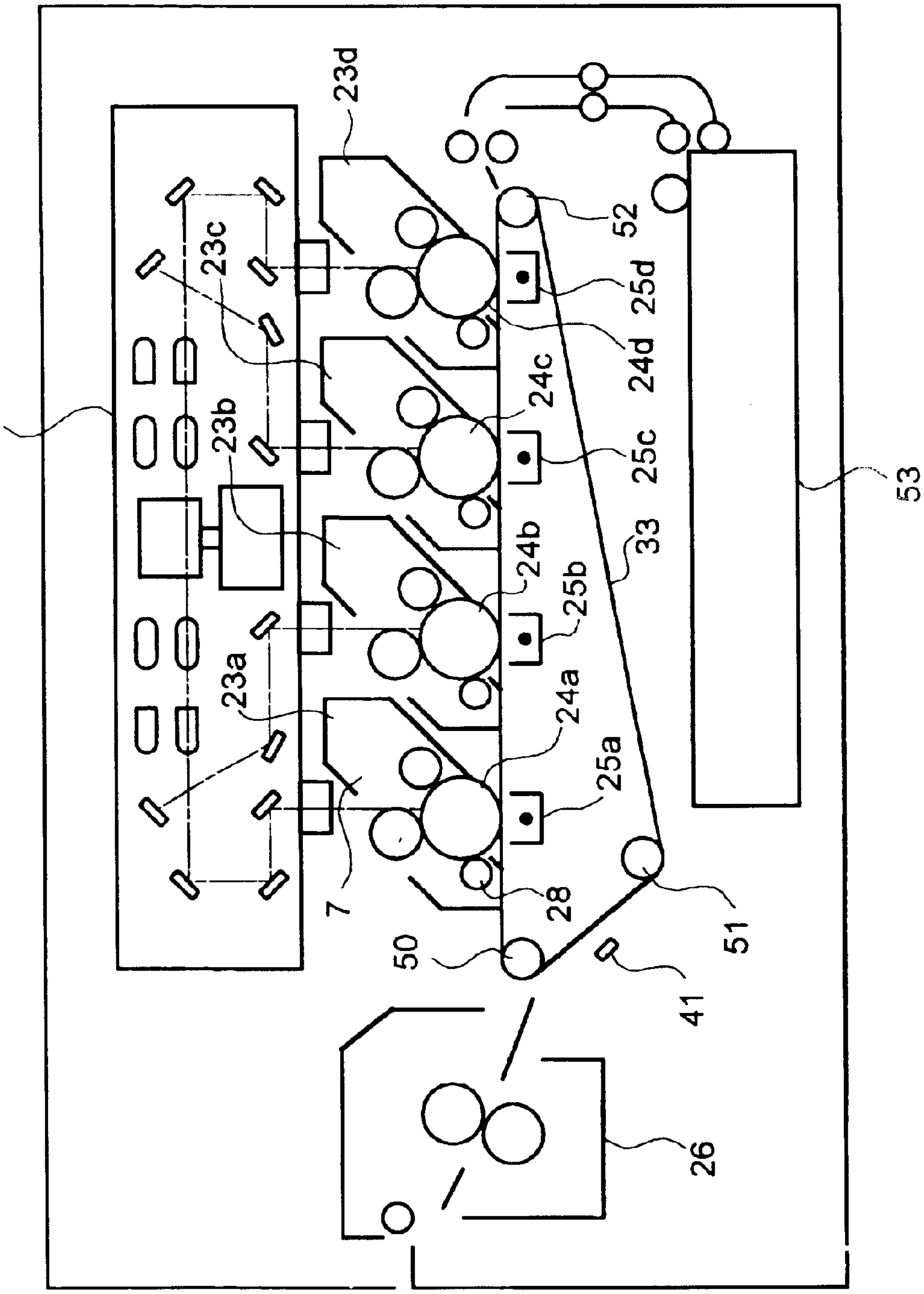
FIG. 2 is a schematic diagram of one example of a tandem type color image forming apparatus according to the first embodiment.

FIG. 2 is a schematic diagram of one example of a tandem type color image forming apparatus according to the first embodiment.

Image data is converted to image data of colors for color recording including black (K), yellow (Y), cyan (C), and magenta (M), and the converted image data is sent to the exposing device 22. The exposing device 22 radiates lights to form electrostatic latent images on photosensitive elements 24*a*, 24*b*, 24*c*, and 24*d* for K, M, C, and Y. Developing devices 23*a*, 23*b*, 23*c*, and 23*d* develop the latent images with color toners to form color toner images.

On the other hand, a recording medium is conveyed from a recording medium feed cassette 53 to the transfer belt 33. The toner images on the photosensitive elements 24*a* to 24*d* are sequentially transferred to the recording medium at each of the transfer devices 25*a*, 25*b*, 25*c*, and 25*d*, and after the toner images are superposed on one another on the recording medium to be fixed by a fixing device 26. The recording medium with the fixed image is discharged to the outside of the color image forming apparatus.

The transfer belt 33 is a translucent endless belt supported by a drive roller 50, a tension roller 51, and a driven roller 52. As the tension roller 51 imparts tensile force to the transfer belt 33 by a biasing unit, the tensile force of the transfer belt 33 is kept at a substantially constant level. A reference moving speed of the transfer belt 33 is 100 mm/sec. An interval between the photosensitive elements is set to 100 millimeters.

The driving unit 3 drives the transfer belt 33 to move the mark pattern formed on the transfer belt 33. The reflection type optical sensor 41 (41*f* and 41*r*) detects the mark pattern. The interval difference acquiring unit 12 compares an interval between color marks in the detected mark pattern with a preset reference interval to calculate an interval difference as a shift of each mark from the reference interval.

Figure 3:
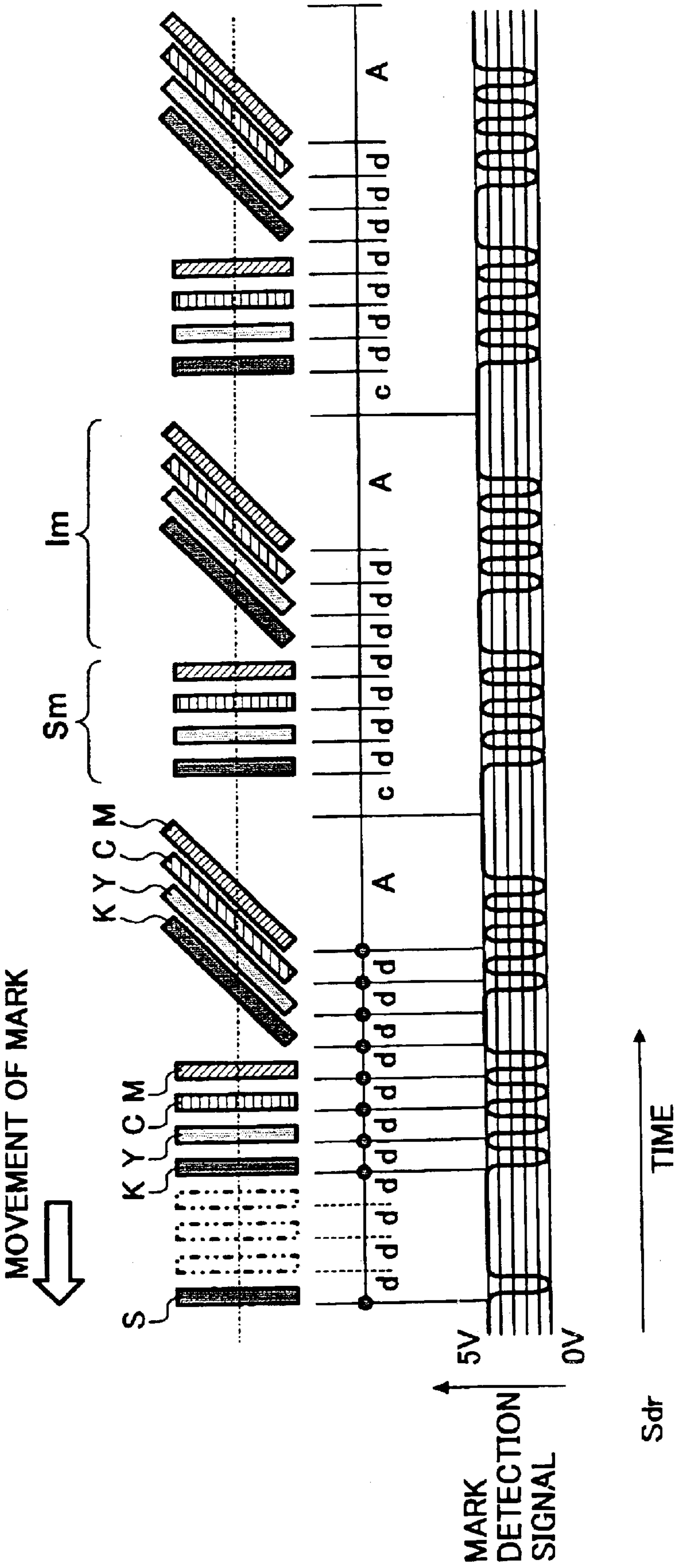
FIG. 3 is a schematic diagram of a mark pattern formed on a transfer belt by a mark pattern forming unit.

FIG. 3 is a schematic diagram of a mark pattern formed on a transfer belt by a mark pattern forming unit 11. In order to prevent color misalignment during image transfer, the mark patterns are formed for testing. The exposing device 22 writes the mark patterns with light on the near side (hereinafter, "front side") and the back (hereinafter, "rear side") of the photosensitive element 24 as shown in FIG. 3 and they are developed. The mark patterns are then transferred to the surface of the transfer belt 33 at both edges thereof in its lateral direction. The mark pattern is formed in plurality to allow increase in detection precision of color misalignment and improvement of reliability.

The mark pattern includes a straight mark group (indicated by reference character Sm in FIG. 3) and an inclined mark group (indicated by reference character Im in FIG. 3) formed on the front side and the rear side, i.e., both edges of the transfer belt. The straight mark group includes M, C, Y, and K marks formed in parallel with a main scanning direction (lateral direction of the transfer belt 33), and the inclined mark group includes the same marks each formed at an angle by 45 degrees with respect to the main scanning direction.

Each interval made in the mark pattern is indicated by a distance d in FIG. 3. The reflection type optical sensors 41*f* (front side) and 41*r* (rear side), depicted in FIG. 11, read the mark pattern consisting of distances d on the transfer belt 33.

The reflection type optical sensor 41 includes a light emitting element, an integrator, and an amplifier, and receives light reflected from or light passing through the transfer belt 33 by a photoelectric transducer such as a phototransistor through a slit. The received light makes the collector-emitter impedance of the phototransistor decrease, and an emitter potential, i.e., the level of a detection signal of the reflection type optical sensor 41 increases (the magnitude of the mark detection signal is expressed by 5 volts in FIG. 3). When the mark pattern reaches the sensor position, the marks cut off the light, and therefore, the collector-emitter impedance of the phototransistor increases, and the emitter potential decreases (the magnitude of the mark detection signal is expressed by 0 volt in FIG. 3). In other words, the detection signal vertically fluctuates depending on whether the mark pattern is present to allow detection of the mark pattern.

Figure 4:
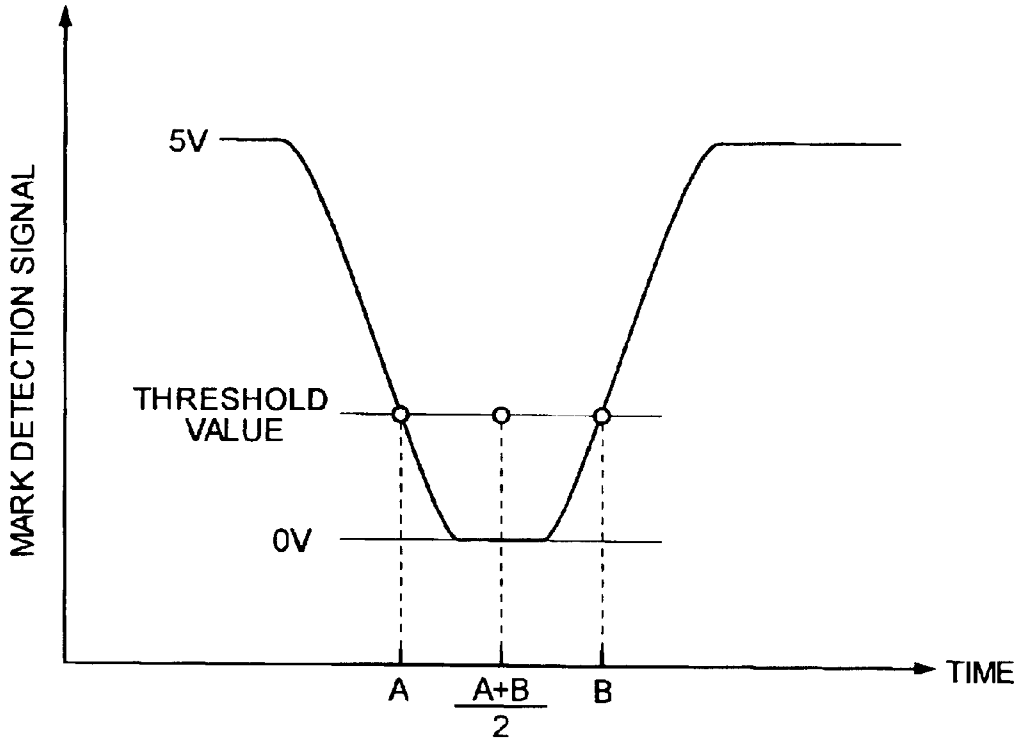
FIG. 4 illustrates detection of a mark position by a reflection type optical sensor.

FIG. 4 illustrates detection of a mark position by a reflection type optical sensor 41. If a threshold value is set for a mark detection signal, the level of the mark detection signal decreases when a mark is passing through the optical sensor 41, and the change in the level is expressed by a downward curve. By setting the threshold value, each point in time at which the level of the mark detection signal is at the threshold value can be detected. Assuming that the points in time are represented by A and B, an intermediate point of the points (A+B)/2 can be determined as the point in time of detecting the mark.

The read detection signal is A–D converted at a predetermined pitch to identify a scanned position, and the scanned position is stored on the memory. The interval difference acquiring unit 12 calculates positions of the marks based on the scanned positions on the memory to acquire a position misalignment of the mark from a reference, i.e., an interval difference. The controller 15 corrects color misalignment based on the acquired interval difference.

The interval difference acquiring unit 12 detects the position misalignment, inclination, or magnification of the marks due to the writing timing by the exposing device 22 to the photosensitive element 24 based on the read mark pattern. In order to eliminate the position misalignment due to the timing, the interval difference acquiring unit 12 compares the position misalignment with a reference moving distance to calculate a difference, and corrects the writing operation of the exposing device 22 based on the difference.

A first moving speed of the transfer belt 33 is slightly different from a second moving speed of the transfer belt 33. The first moving speed is detected when a position misalignment is detected, that is, at the time of detecting whether there is a position misalignment of a mark in the mark pattern. More specifically, the time indicates a period from when the mark pattern forming unit 11 forms mark patterns on the transfer belt 33 until the reflection type optical sensors 41*f* and 41*r* detect the mark patterns. The second moving speed is detected when a recording medium is fed, that is, at the time of feeding the recording medium for image formation. More specifically, the time indicates a period from when the recording medium is adhered to the transfer belt 33 and conveyed until ordinary image formation is performed on the recording medium. The inventors of the present invention have noticed that occurrence of color misalignment at the time of actual image formation is prevented by using the speed difference that has caused the color misalignment.

A deviation amount of the writing timing is reduced and calculated from the speed difference between the first moving speed and second moving speed, and the ordinary image formation is performed by the reduced timing to more accurately prevent color misalignment. Thus, it is possible to provide the color image forming apparatus with higher precision.

The speed detector 13 reads a speed mark (not shown) formed on the transfer belt 33, for measuring a speed, through the reflection type optical sensor 41 to detect the moving speed of the transfer belt 33. The optical sensor 41 serves also as a speed sensor in this case, but a sensor for speed detection may be provided discretely from the optical sensor 41.

The speed detector 13 and the speed difference calculating unit 14 detect and calculate the moving speed of the transfer belt 33 even when the ordinary image formation is performed on the recording medium.

The speed detector 13 detects the first moving speed v1 of the transfer belt 33. The speed detector 13 also detects the second moving speed v2 of the transfer belt 33. The speed difference calculating unit 14 calculates a speed difference $\Delta v = v1 - v2$ from the detected v1 and v2.

Figure 5:
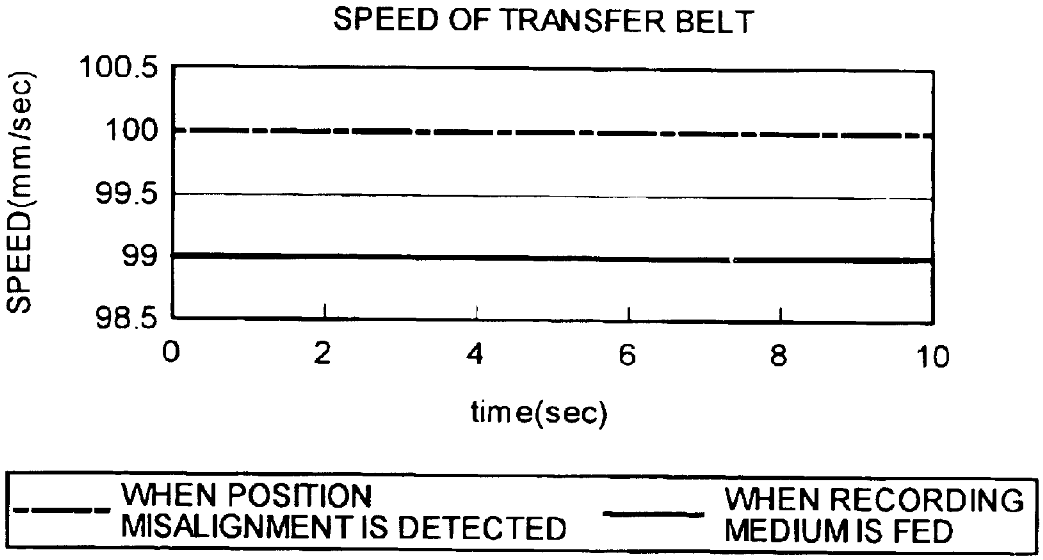
FIG. 5 is a graph illustrating moving speed of a transfer belt when detecting a position difference and the speed of the transfer belt when feeding a recording medium.

FIG. 5 is a graph illustrating the first and second moving speeds of the transfer belt. Even if the controller 15 has already corrected the ordinary position misalignment based on the interval difference acquired by the interval difference acquiring unit 12, color misalignment may occur due to a slight difference between the first moving speed and the second moving speed of the transfer belt 33. Herein, the reference moving speed of the transfer belt is set to 100 mm/sec.

As shown in FIG. 5, the first moving speed of the transfer belt 33 has been corrected so as to be equal to the reference moving speed. On the other hand, the second moving speed is slower by 1 mm/sec with respect to the reference moving speed, that is, 99 mm/sec.

Figure 6:
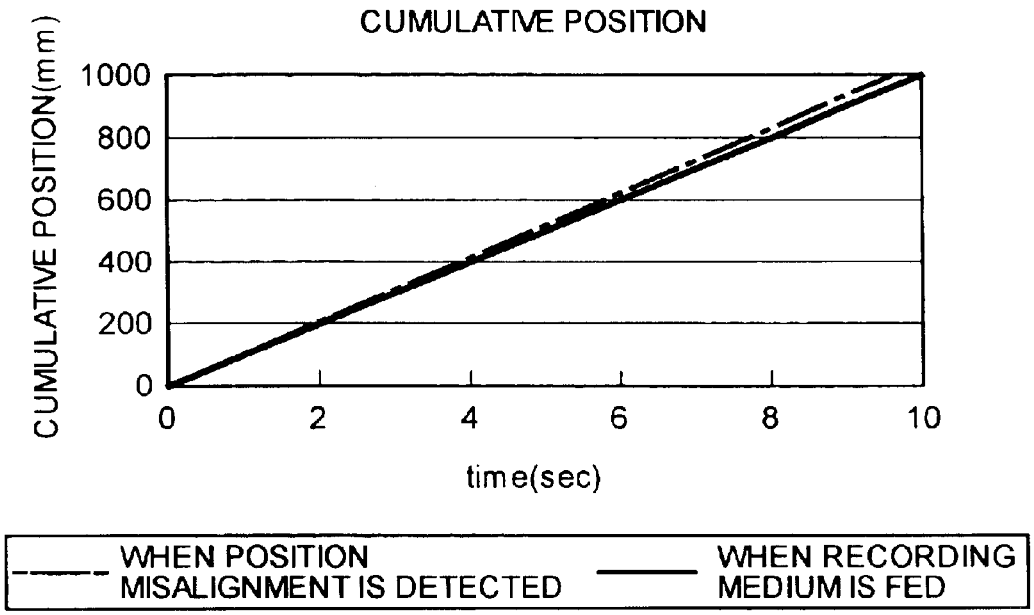
FIG. 6 is a graph illustrating a movement amount (cumulative position) of the transfer belt obtained by integrating the graph of FIG. 5.

FIG. 6 is a graph illustrating a movement amount (cumulative position) of the transfer belt obtained by integrating the graph of FIG. 5.

Figure 7:
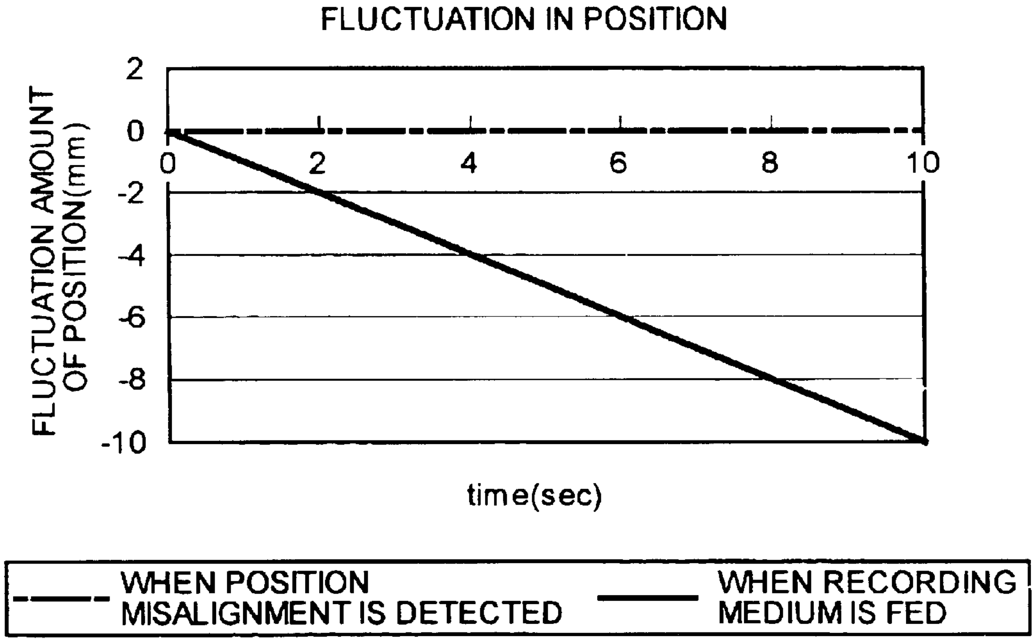
FIG. 7 is a graph obtained by extracting a fluctuation amount (deviation from the reference) from the movement amount of the transfer belt.

FIG. 7 is a graph obtained by extracting a fluctuation amount (deviation from the reference) from the movement amount of the transfer belt.

Figure 8:
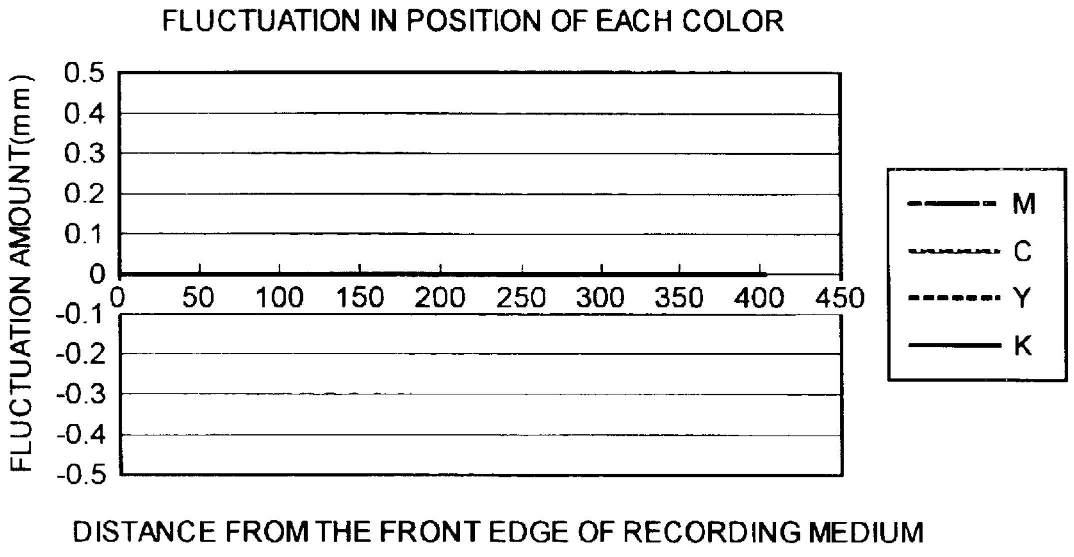
FIG. 8 is a graph obtained by separating waveforms when position misalignment is detected in the graph of FIG. 7 in image forming region of each color, and superposing the separated waveforms.

FIG. 8 is a graph obtained by separating waveforms when the position misalignment is detected in the graph of FIG. 7 in image forming region of each color, and superposing the separated waveforms. In other words, the colors are printed without misalignment at the first moving speed of the transfer belt.

Figure 9:
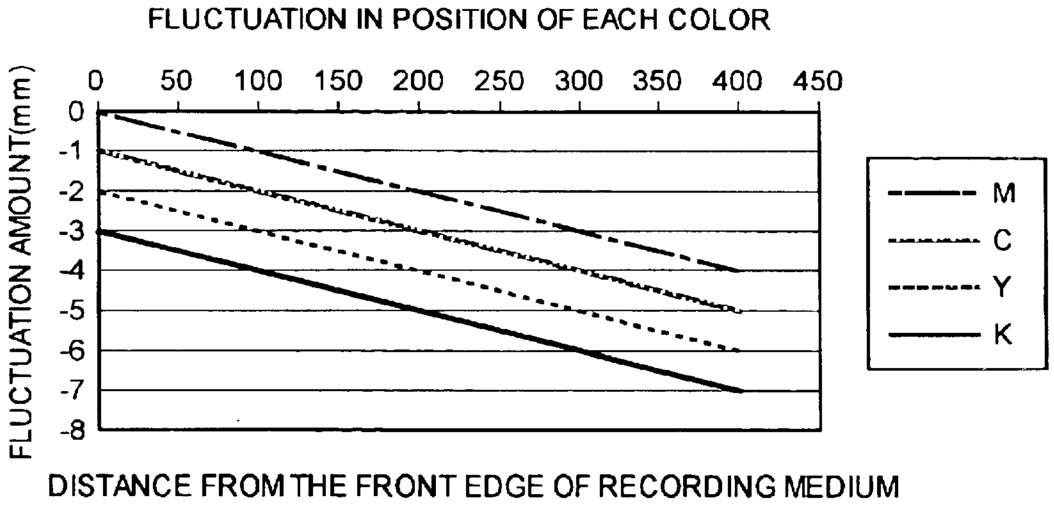
FIG. 9 is a graph obtained by separating waveforms when the recording medium is fed in the graph of FIG. 7 in image forming region of each color, and superposing the separated waveforms.

FIG. 9 is a graph obtained by separating waveforms when the recording medium is fed in the graph of FIG. 7 in image forming region of each color, and superposing the separated waveforms. Herein, the second moving speed of the transfer belt is slower, which indicates that the colors are printed in such a manner that they are resultantly shifted from one another.

The controller 15 controls the image forming unit 2 based on the interval difference and the speed difference $\Delta v$ to determine a timing of forming an electrostatic latent image on the photosensitive element 24 so that the color misalignment does not occur on the transfer belt 33.

If the first moving speed is different from the second moving speed, a position misalignment occurs as shown in FIG. 9. Generally, the position misalignment is indicated by a deviation amount from a reference color. If deviation amounts with respect to M are read from FIG. 9, then the deviation amount of K with respect to M is 3 millimeters, Y is 2 millimeters, and C is 1 millimeter.

The writing timings for the colors when the position misalignment is corrected without considering the change in the moving speed of the transfer belt are timings shown in the upper row (in the case of FIG. 8) of table 1 as explained below. However, if the recording medium is fed at this timing, then the moving speed of the transfer belt is changed, which causes the position misalignments as shown in FIG. 9 to occur. Therefore, writing is performed for the colors at timings as shown in the lower row of the table 1 (in the case of FIG. 9).

TABLE 1

| | M | C | Y | K |
|---|---|---|---|---|
| FIG. 8 | 0 | 1 sec after M | 2 sec after M | 3 sec after M |
| FIG. 9 | 0 | 1.01 sec after M | 2.02 sec after M | 3.03 sec after M |

Values given in the lower row of the table 1 can be obtained in the following manner.

1) First moving speed of the transfer belt when the position misalignment is detected: 100 mm/sec.
2) Second moving speed of the transfer belt when the recording medium is fed: 99 mm/sec.
3) Writing timing when the position misalignments are detected: for each 1 sec based on M as a reference.
4) Time for movement of the recording medium between the photosensitive elements having an interval of 100 millimeters: 100/99=1.01 seconds.

Therefore, the writing timing for C adjacent to M is 1.01 seconds after the reference timing, which is delayed by 0.01 second from the reference timing.

The values for Y and K are calculated in the same manner.

By correcting the writing operation based on the values, a high quality image without any position misalignments therein can be obtained.

In order for the color image forming apparatus to use the process cartridge, it is desirable to form the speed mark on the surface opposite to the surface of the transfer belt 33 that carries the recording medium.

In order for the color image forming apparatus to use the process cartridge, it is desirable to structure the color image forming apparatus so that the process cartridge does not pass over the speed mark previously formed on the transfer belt 33 when it is attached to or detached from the color image forming apparatus.

In order for the color image forming apparatus to use the process cartridge; it is desirable to structure the color image forming apparatus so that the process cartridge does not pass over the mark pattern formed on the transfer belt 33 when it is attached to or detached from the color image forming apparatus.

Figure 10:
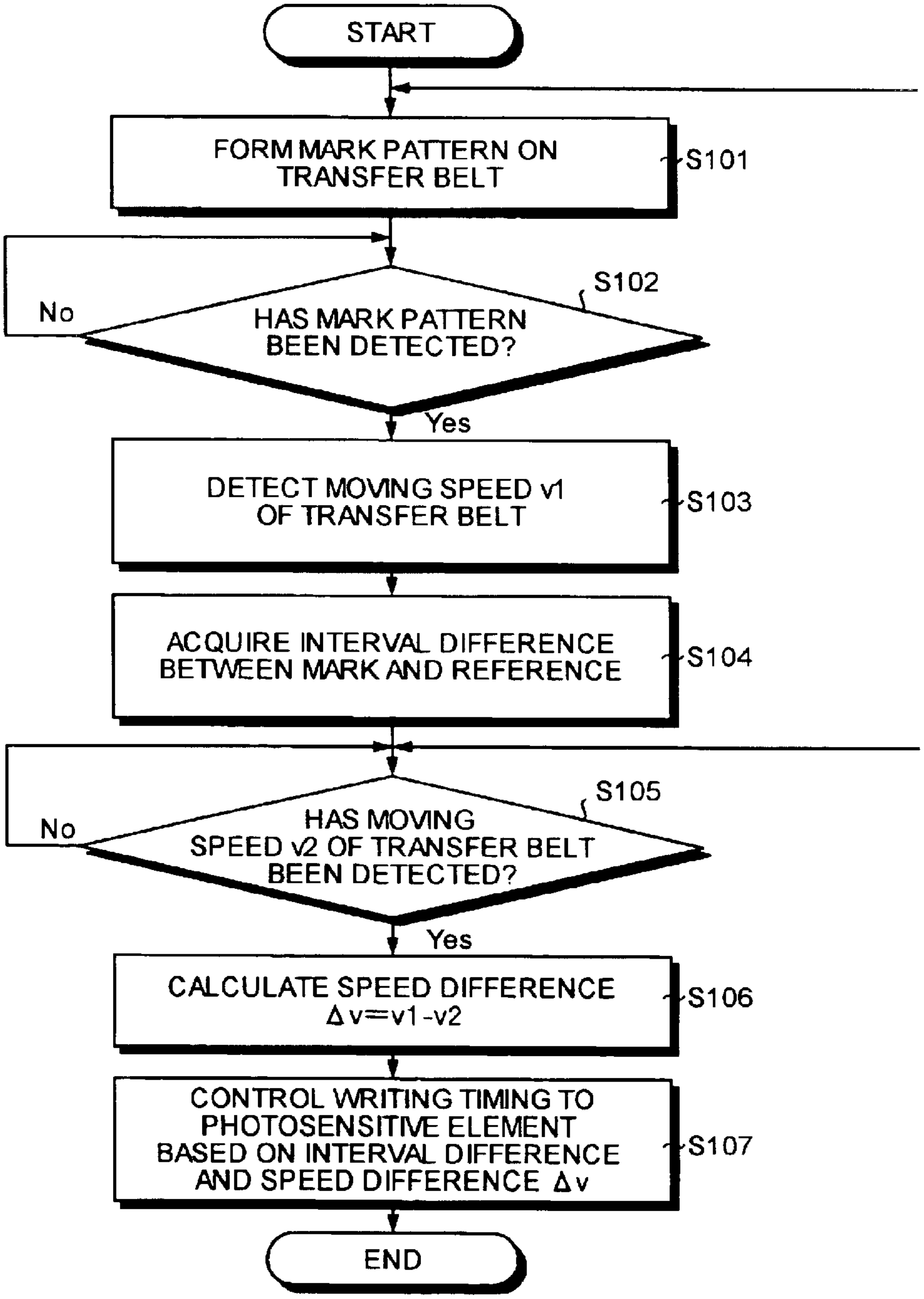
FIG. 10 is a flowchart of a position misalignment correcting operation of the color image forming apparatus according to the first embodiment.

FIG. 10 is a flowchart of a color misalignment correcting operation of the color image forming apparatus according to the first embodiment. The transfer belt 33 starts moving as soon as image formation is started. The mark pattern forming unit 11 controls the charger 21, the exposing device 22, and the photosensitive element 24 to form an electrostatic latent image for a mark pattern on the photosensitive element 24, and forms the mark pattern on the transfer belt 33 by the developing device 23 (step S101). The transfer belt 33 with the mark pattern formed thereon continuously moves up to the position where the reflection type optical sensor 41 can read the mark pattern. The optical sensor 41 enters into an operation of detecting the mark pattern (step S102).

When it does not detect the mark pattern, the optical sensor 41 continues the same operation as it is (step S102, No). When the optical sensor 41 detects the mark pattern (step S102, Yes), the speed detector 13 detects the moving speed v1 of the transfer belt 33 from the formation of the mark pattern until the end of the detection thereof (step S103).

The interval difference acquiring unit 12 compares each position of the detected color marks with the preset reference interval to calculate an interval difference (step S104).

Subsequently, the color image forming apparatus enters into the operation of ordinary image formation. In this case, when the image formation is started by activating the color image forming apparatus, it is preferable to operate test printing. This is because it is preferable to detect the moving speed of the transfer belt at the time of feeding the recording medium for actual printing.

The speed detector 13 detects the second moving speed v2 of the transfer belt 33 at the time of ordinary image formation (step S105). When the second moving speed is not detected, the speed detector 13 continues the detecting operation (step S105, No). On the other hand, when the second moving speed is detected, the speed detector 13 sets the detected moving speed as v2, and the speed difference calculating unit 14 calculates a speed difference $\Delta v = v1 - v2$ from the detected v1 and v2. (step S106).

The controller 15 controls the image forming unit 2 based on the interval difference and the calculated speed difference $\Delta v$ to determine the timing of forming an electrostatic latent image on the photosensitive element 24 so as to prevent occurrence of the color misalignment on the transfer belt 33 (step S107).

The timing may be first corrected based on the interval difference at the time of forming the mark pattern acquired by the interval difference acquiring unit 12, and the moving speed of the transfer belt may be corrected based on the change in the moving speed of the transfer belt. Alternatively, both of the corrections may be concurrently made based on the interval difference and the change in the moving speed of the transfer belt.

In the method of detecting the speed of the transfer belt 33, the rotational speed of the transfer belt 33 is detected at any part of a drive system of the drive roller 50 without using the speed mark on the transfer belt 33, and the moving speed of the transfer belt 33 can also be calculated from the detected rotational speed.

Figure 11:
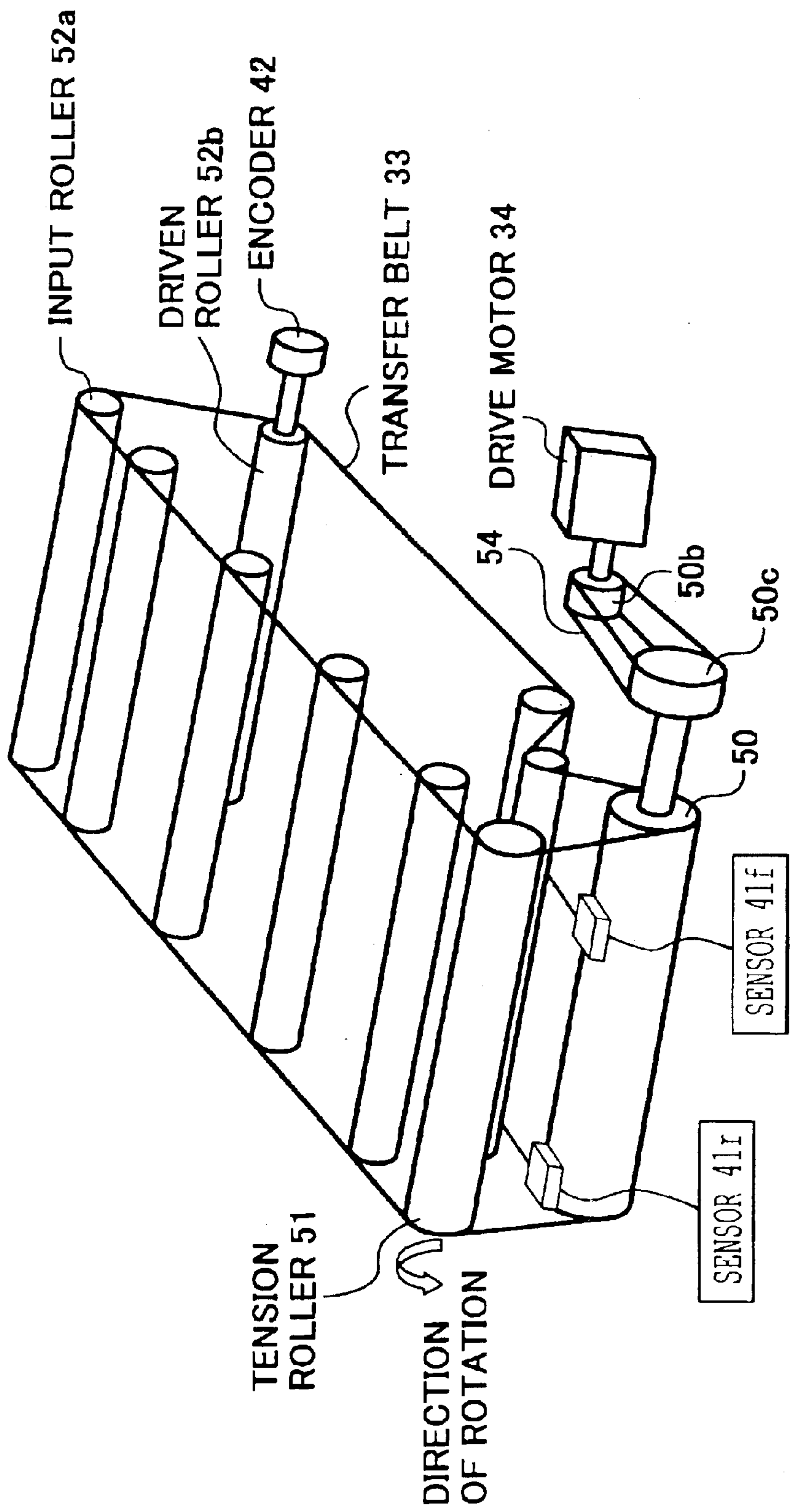
FIG. 11 is a schematic diagram of an example of another speed detector.

FIG. 11 is a schematic diagram of an example of another speed detector. The encoder 42 rotates integrally with a roller 52*b* that guides the transfer belt 33, and detects the moving speed of the transfer belt 33. As the encoder 42 and the technology of detecting the speed using the encoder 42 are the known technologies, explanation thereof is omitted.

As explained above, the interval difference acquiring unit detects the mark pattern and acquires an interval difference as a position misalignment of each mark from the reference. Further, the speed difference calculating unit calculates a speed difference between the first moving speed of the transfer belt, from the formation of the mark pattern until the end of detection of the mark pattern, and the second moving speed thereof at the time of ordinary image formation (at the time of feeding the recording medium for printing). The controller determines the timing of image formation in the image forming unit based on the acquired interval difference and speed difference. Therefore, it is possible to improve alignment precision when the colors are transferred, and to output a high quality image. Particularly, the tandem type color image forming apparatus according to the first embodiment can provide a high quality image at a high speed with low cost.

Figure 17:
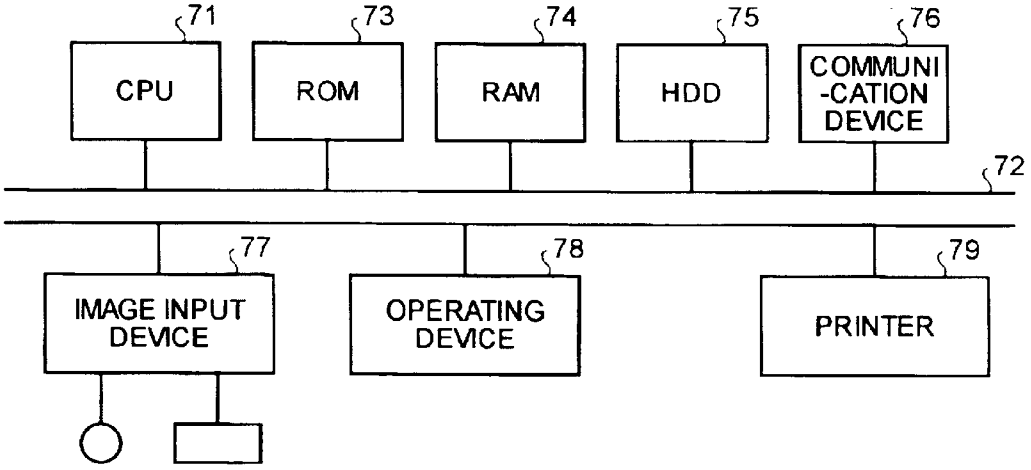
FIG. 17 is a block diagram of hardware of the color image forming apparatus according to the first embodiment.

FIG. 17 is a block diagram of hardware of the color image forming apparatus according to the first embodiment. The color image forming apparatus can be realized by executing a program prepared in advance by a computer system 7. A central processing unit (CPU) 71 controls the whole of the computer system 7. The CPU 71 is connected with a read only memory (ROM) 73, a random access memory (RAM) 74, a hard disk drive (HDD) 75 as a storage device, a communication device 76, an image input device 77, an operating device 78, and a printer 79 through a bus 72.

The RAM 74 temporarily stores at least a part of a program of an operating system (OS) and an application program that are executed by the CPU 71. The RAM 74 also stores various types of data required for processing executed by the CPU 71. The HDD 75 stores the OS, driver programs, and application programs.

Figure 12:
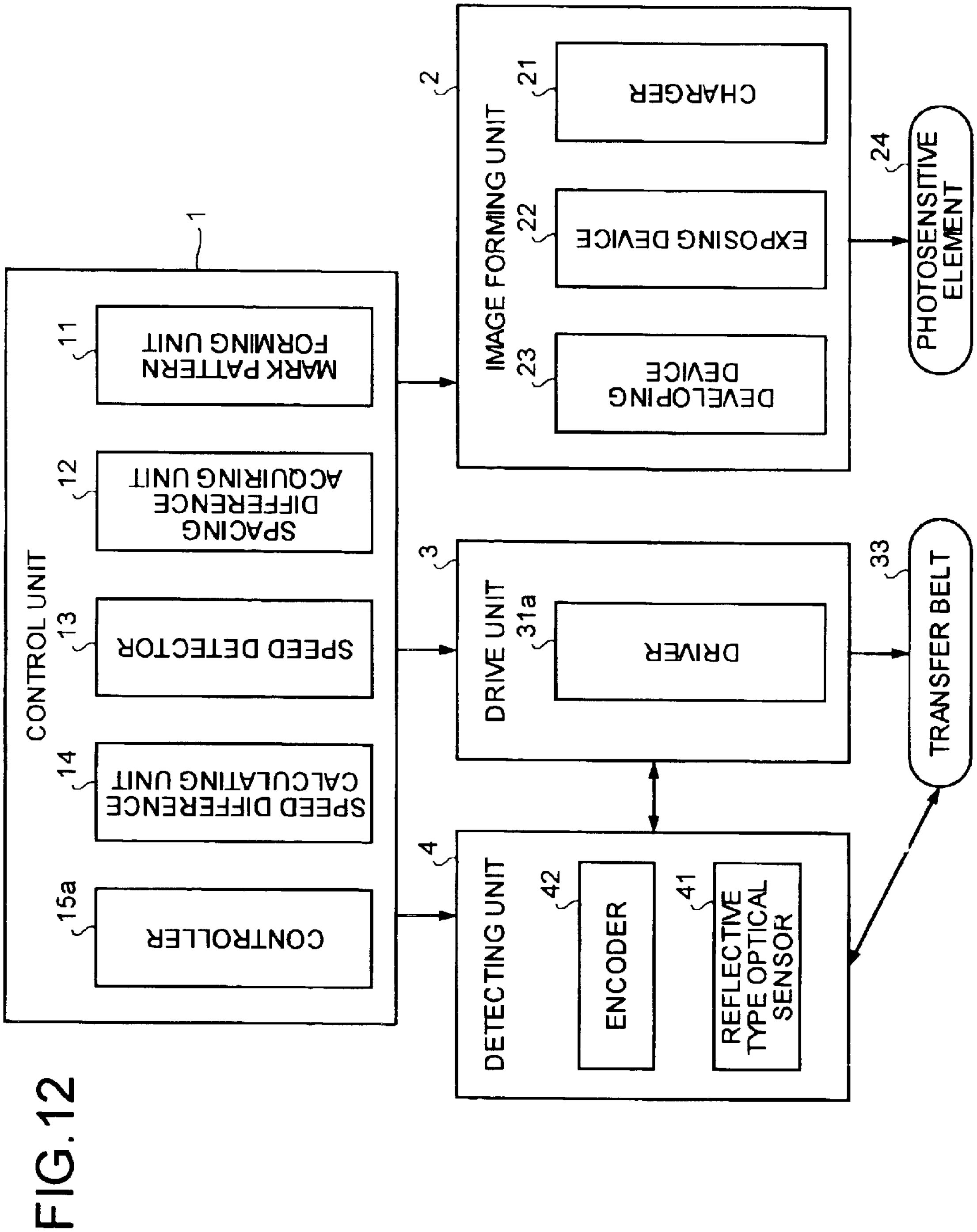
FIG. 12 is a block diagram of a color image forming apparatus according to a second embodiment of the present invention.

FIG. 12 is a block diagram of a color image forming apparatus according to a second embodiment of the present invention. The color image forming apparatus is different from the first embodiment in such points that a driver 31*a* can change the moving speed of the transfer belt and a controller 15*a* controls the speed of the driver 31*a* based on the interval difference on the mark pattern and a difference between the moving speeds of the transfer belt, and corrects color misalignment.

The mark pattern, the operation of the mark pattern forming unit 11, the operation of the reflection type optical sensor 41, the operation of the interval difference acquiring unit 12, the operation of the speed detector 13, and the operation of the speed difference calculating unit 14 are the same as those of the first embodiment, and therefore, explanation thereof is omitted.

Further, the transfer belt, specifications of the transfer belt, the initial moving speed of the transfer belt, and the interval between the photosensitive elements are the same as those of the first embodiment. Therefore, the moving speed of the transfer belt in particular of the second embodiment is explained also with reference to FIG. 5 to FIG. 9 as used in the first embodiment.

Referring back to FIG. 11, how a drive motor 34 drives the transfer belt 33 is explained below. The rotation of a roller 50*b* connected to the drive motor 34 for the transfer belt is transmitted to a roller 50*c* through a belt 54 to rotate the drive roller 50. The controller 15*a* controls the drive motor 34 to rotate. The controller 15*a* changes the moving speed of the transfer belt 33 by the drive motor 34 based on the interval difference and the difference between the moving speeds of the transfer belt so as to eliminate a position misalignment of the mark pattern.

The speed may be detected in the same manner as that of the first embodiment. More specifically, the reflection type optical sensor 41 may detect the speed mark for detecting the speed. Alternatively, the rotational speed of the transfer belt 33 may be detected at any part of the driving unit such as the drive roller 50 and the drive mechanism that transmits drive force to the drive roller 50, and the moving speed of the transfer belt 33 can be calculated by using the encoder 42 (FIG. 11). The technology of detecting the moving speed of the transfer belt 33 using the encoder 42 is the known technology, and therefore, explanation thereof is omitted.

The operation of correcting color misalignment by the controller 15*a* of the second embodiment is explained by referring again to FIG. 5 to FIG. 9.

FIG. 5 is the graph illustrating the first moving speed and the second moving speed of the transfer belt 33. Even if the controller 15*a* has already corrected the ordinary position misalignment based on the interval difference acquired by the interval difference acquiring unit 12, color misalignment may occur due to a slight difference between the first moving speed and the second moving speed of the transfer belt 33. Herein, the reference moving speed of the transfer belt is set to 100 mm/sec.

As shown in FIG. 5, the first moving speed of the transfer belt 33 has been corrected so as to be equal to the reference moving speed. On the other hand, the second moving speed is slower by 1 mm/sec with respect to the reference moving speed, that is, 99 mm/sec.

FIG. 6 is the graph illustrating a movement amount (cumulative position) of the transfer belt obtained by integrating values in the graph of FIG. 5.

FIG. 7 is the graph obtained by extracting a fluctuation amount (deviation amount from the reference) from the movement amount (cumulative position) of the transfer belt.

FIG. 8 is the graph obtained by separating waveforms when the position misalignment is detected in the graph of FIG. 7 in each image forming region of each color, and superposing the separated waveforms. In other words, the colors are printed without misalignment at the first moving speed of the transfer belt.

FIG. 9 is the graph obtained by separating waveforms when the recording medium is fed in the graph of FIG. 7 in each image forming region of each color, and superposing the separated waveforms. Herein, the moving speed of the transfer belt at the time of feeding the recording medium is slower, which indicates that the colors are printed in such a manner that they are resultantly shifted from one another.

If the first moving speed is different from the second moving speed, color misalignment occurs as shown in FIG. 9. The color misalignment is represented by an amount of a shift of a color from a reference color. If deviation amounts with respect to M are read from FIG. 9, then the deviation amount of K with respect to M is 3 millimeters, Y is 2 millimeters, and C is 1 millimeter.

Figure 13:
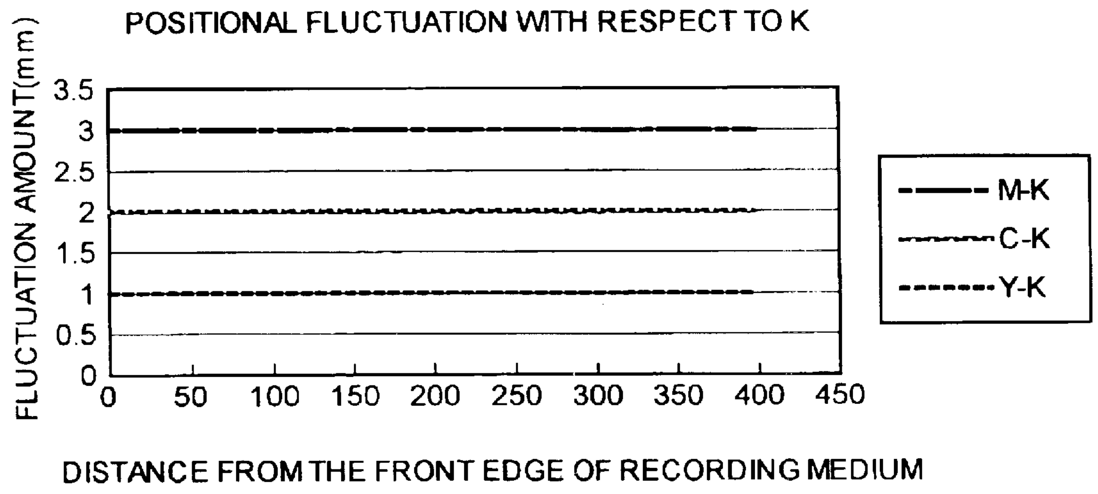
FIG. 13 is a graph illustrating amounts of position misalignment with respect to K in the graph of FIG. 9.

FIG. 13 is a graph illustrating amounts of position misalignment with respect to K in the graph of FIG. 9.

The correction is made as indicated in table 2 explained below to allow prevention of the color misalignment.

TABLE 2

| | When position misalignment is detected | When recording medium is fed (before speed change) | When recording medium is fed (after speed change) |
|---|---|---|---|
| FIG. 5 | 10 mm/sec | 99 mm/sec | 100 mm/sec |

The values given in the table 2 can be obtained in the following manner.

1) An average value calculated from the first moving speeds of the transfer belt when the position misalignment is detected: 100 mm/sec.

2) An average value calculated from the second moving speeds of the transfer belt when the recording medium is fed: 99 mm/sec.

3) An average speed difference between the first moving speed and the second moving speed: 100−99=1 mm/sec.

Therefore, the speed of the transfer belt when the recording medium is fed is set faster by an amount corresponding to +1 mm/sec by varying the speed of the driver (motor) for the transfer belt 33. In an actual case, the setting is conducted by controlling the drive frequency of the motor by the amount corresponding to +1 mm/sec. Thus, the average moving speed of the transfer belt when the position misalignment is detected can match with the average moving speed when the recording medium is fed. The motor may be a stepping motor or a DC motor, and any other motor can also be used.

Figure 14:
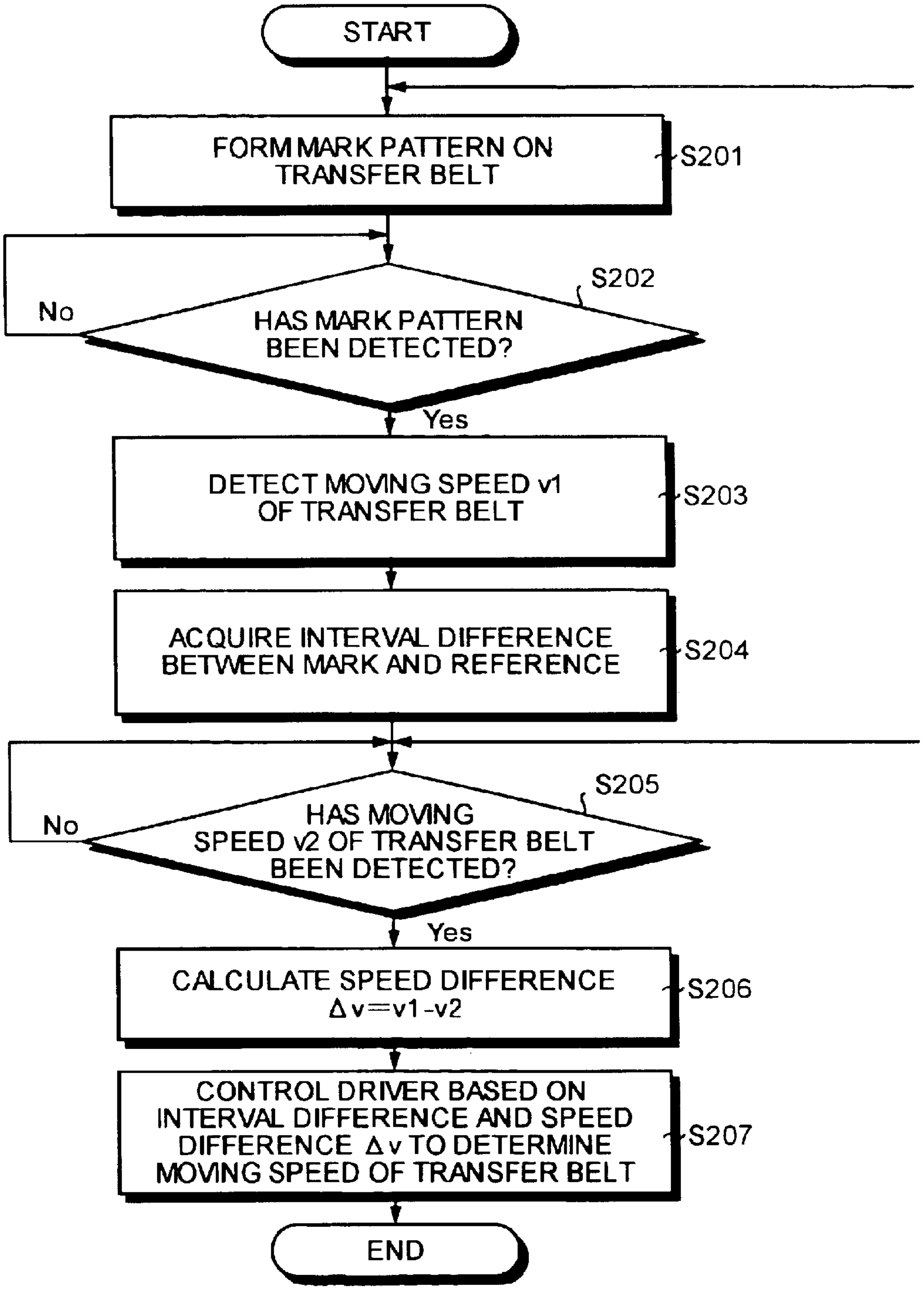
FIG. 14 is a flowchart of a position misalignment correcting operation of the color image forming apparatus according to the second embodiment.

FIG. 14 is a flowchart of a position misalignment correcting operation of the color image forming apparatus according to the second embodiment.

Step S201 to step S206 are the same as step S101 to step S106 in FIG. 10, and therefore, explanation thereof is omitted. More specifically, the steps include starting the color image forming apparatus, starting the transfer belt 33 to move, and forming the mark pattern on the transfer belt 33 in the mark pattern forming unit 11.

The controller 15*a* controls the drive motor 34 for the transfer belt 33 (FIG. 11) to determine the moving speed of the transfer belt 33, based on the interval difference and the speed difference Δv calculated by the speed difference calculating unit 14, and to superpose each color on the recording medium so as to prevent occurrence of the color misalignment (step S207).

The timing of forming the latent image may be first corrected based on the interval difference acquired by the interval difference acquiring unit 12, and then the moving speed of the transfer belt may be corrected based on the change in the moving speed of the transfer belt. Alternatively, both of the corrections may be concurrently made based on the interval difference and the change in the moving speed of the transfer belt.

In the method of detecting the speed of the transfer belt 33, the rotational speed of the transfer belt 33 is detected at any part of the drive system of the drive roller 50 without using the speed mark on the transfer belt 33, and the moving speed of the transfer belt 33 can also be calculated from the detected rotational speed.

The color misalignment is corrected under control of the controller of the second embodiment by matching between the first average moving speed based on the interval difference and the second average moving speed by varying the speed of the driver for the transfer belt. By matching the first average moving speed with the second average moving speed, it is possible to improve alignment precision when the colors are transferred, and to output a high quality image. Particularly, by applying the color image forming apparatus to the tandem type color image forming apparatus, a high quality image can be provided at a high speed with low cost.

A process cartridge is detachably attached to the color image forming apparatus according to the first embodiment or the second embodiment. The process cartridge includes a combination of the photosensitive element 24 with at least one of the charger 21, the developing device 23, and the cleaning device 28 for the photosensitive element 24. The process cartridge, for forming an image in a region that does not face the mark pattern previously formed on the transfer belt 33, is preferably applied to the color image forming apparatus.

Figure 15:
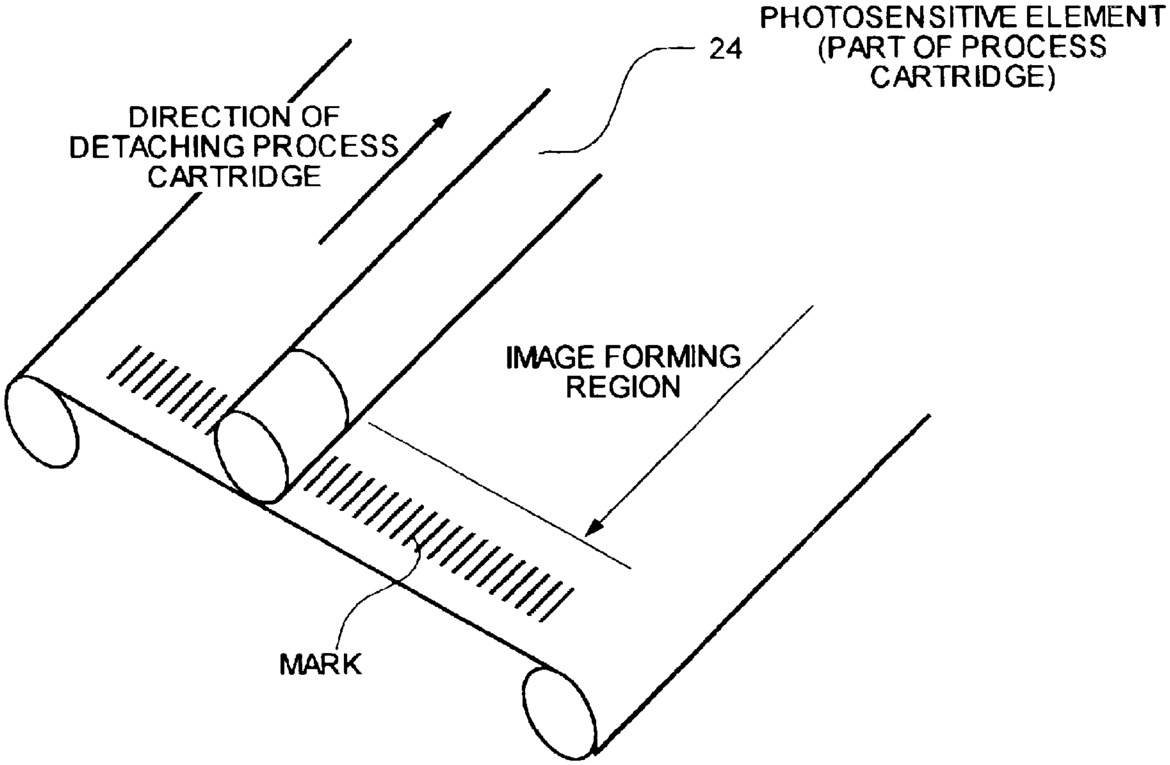
FIG. 15 is a schematic diagram of one example of a positional relationship between a process cartridge and a mark pattern formed on the transfer belt.

FIG. 15 is a schematic diagram of one example of a positional relationship between a process cartridge and a mark pattern formed on the transfer belt. An ordinary image forming region is provided on the photosensitive element 24 so that the region does not face the mark pattern. The photosensitive element 24 is a part of the process cartridge.

Figure 16:
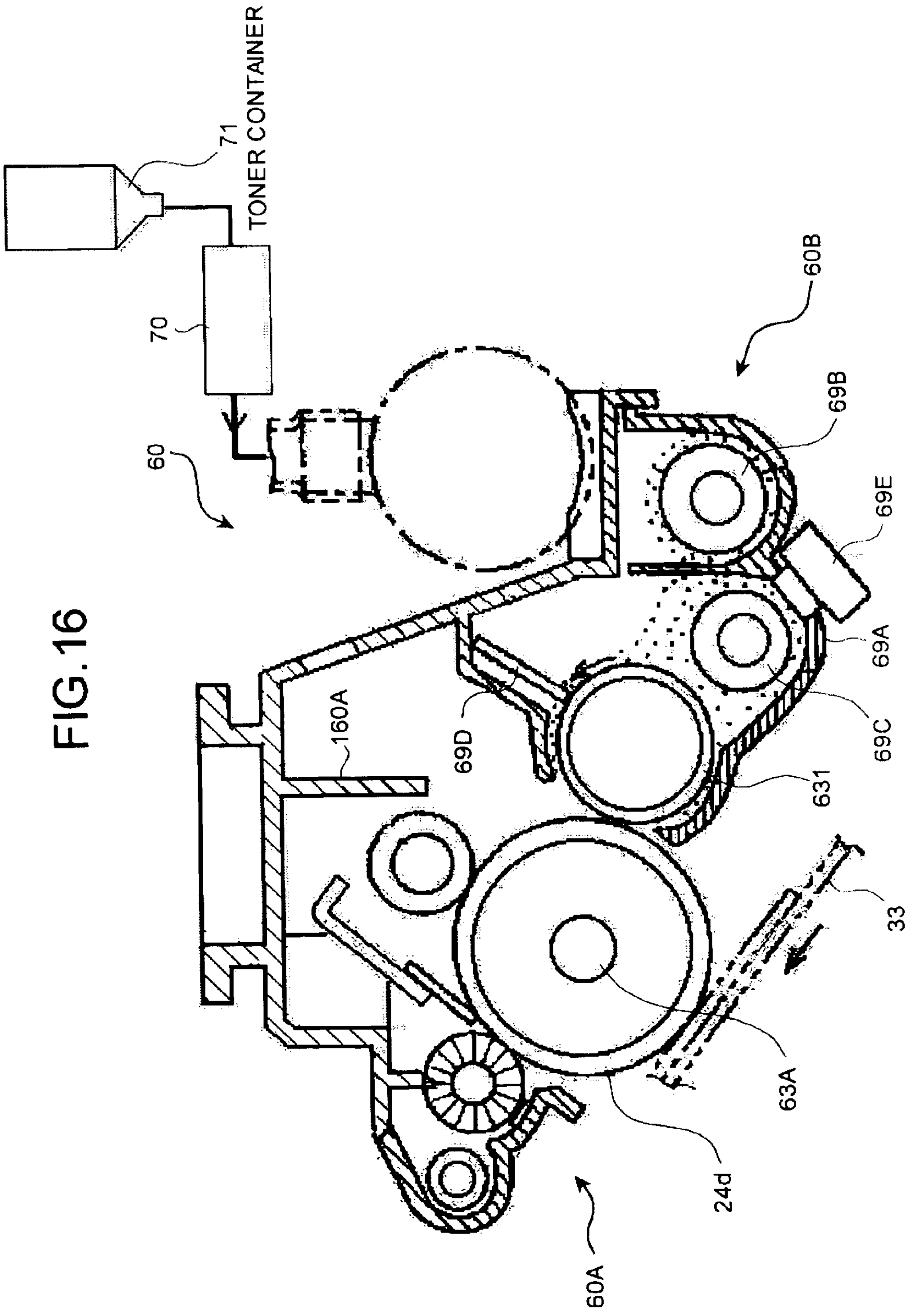
FIG. 16 is a schematic diagram of an example of a process cartridge according to an embodiment of the present invention.

FIG. 16 is a schematic diagram of an example of a process cartridge according to an embodiment of the present invention. The developing device 23*d* for yellow (Y) of the developing devices is explained herein, but the other developing devices also have the same structure as that of the developing device 23*d*, therefore, explanation thereof is omitted. A process cartridge 60 includes a photosensitive element unit 60A and a developing unit 60B.

The developing unit 60B includes a developing roller 631 disposed so that a part of the roller 631 is exposed from an opening of a developing case 69A, conveying screws 69C and 69B, a developing doctor 69D, and a toner density sensor 69E. The developing unit 60B can be supplied with toner from a toner container 71 by a powder pump 70.

The developing case 69A accommodates two-component developer (hereinafter, "developer") containing magnetic carrier and negatively charged toner. The developer is frictionally charged while being agitated and conveyed by the conveying screws 69C and 69B, and is carried on the surface of the developing roller 631. The layer thickness of the developer is restricted by the developing doctor 69D and conveyed to a developing position that faces the photoreceptive drum 24*d*, and the toner is deposited on the electrostatic latent image on the photoreceptive drum 24*d* to form a toner image of a predetermined color thereon. The developer in which the toner is consumed for development is returned into the developing case 69A by following the rotation of the developing roller 631. The toner density sensor 69E detects the toner density of the developer in the developing case 69A, and the powder pump 70 replenishes the developing case 69A with toner from the toner container 71 as required.

As a reference point for attaching the process cartridge to the main body of the image forming apparatus, the process cartridge 60 has main positioning points 63A and sub-positioning points. The main positioning points 63A are holes made on flanges of both edges of the photoreceptive drum 24*d*, and the sub-positioning points are provided in a process cartridge frame 160A on the front side and the rear side thereof. When being attached to the main body, the process cartridge can be reliably positioned at a predetermined attachment position by the reference points and engaging parts provided on the main body.

The photoreceptive drum 24*d* is in contact with the transfer belt 33 of the transfer unit provided under the drum 24*d* to form a nip for transfer as a transfer position.

The process cartridge 60 can be detachably attached to the image processing apparatus while the mark pattern formed on the transfer belt 33 is prevented from being damaged.

In order to use the process cartridge 60 for the color image forming apparatus, it is desirable to form the speed mark on the surface opposite to the surface of the transfer belt 33 that carries the recording medium.

Further, in order to use the process cartridge 60 for the color image forming apparatus, it is desirable to structure the color image forming apparatus so that the process cartridge does not pass over the speed mark previously formed on the transfer belt 33 when it is attached to or detached from the color image forming apparatus.

Furthermore, in order to use the process cartridge 60 for the color image forming apparatus, it is desirable to structure the color image forming apparatus so that the process cartridge does not pass over the mark pattern formed on the transfer belt 33 when it is attached to or detached from the color image forming apparatus.

The tandem type color image forming apparatus as a color laser printer has been explained in the embodiments. However, the present invention is also applicable to any monochrome laser printer including one toner image forming unit using black toner. The present invention also applicable to any other type of image forming apparatus such as a copier, printer, and facsimile of transferring an image to a recording material through an intermediate transfer body that carries the image. The example of the drum-like photosensitive element used as a rotator has been explained, but it is needless to say that the present invention can also employ any rotatable drive device such as a photosensitive element belt, a transfer belt, and an intermediate transfer body (belt, cylinder).

According to the present invention, the image formation is accurately corrected to improve alignment precision in each color, thus it is possible to provide the color image forming apparatus capable of outputting a high quality image at a high speed with low cost.

According to the present invention, the image formation is accurately corrected to improve alignment precision in each color, thus it is possible to provide the tandem type color image forming apparatus capable of outputting a high quality image at a high speed with low cost.

According to the present invention, the color image formation is accurately corrected to improve alignment precision in each color, thus it is possible to provide the process cartridge used in the color image forming apparatus capable of outputting a high quality image.

Furthermore, the color image formation is accurately corrected by controlling the driving unit to improve alignment precision in each color, thus it is possible to provide the process cartridge used in the color image forming apparatus capable of outputting a high quality image.

Moreover, it is possible to provide the process cartridge, used in the color image forming apparatus, which is detachable and is hard to damage the speed mark on the transfer belt.

The present document incorporates by reference the entire contents of Japanese priority documents, 2002-276746 filed in Japan on Sep. 24, 2002, 2002-276747 filed in Japan on Sep. 24, 2002 and 2003-305293 filed in Japan on Aug. 28, 2003.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A color image forming apparatus comprising:

an electrostatic charger;

an image carrier that is charged by the electrostatic charger;

an exposing unit that irradiates a light to the image carrier to form a latent image on the image carrier;

a developing unit that develops the latent image with toner of a specific color to form a toner image of the specific color;

a transfer belt that moves at a specific moving speed to feed the recording medium to the developing unit so that the toner image is transferred to the recording medium;

a pattern forming unit that forms a mark pattern including a first mark and a second mark on the transfer belt using toner;

a sensor that detects the first mark and the second mark while the transfer belt is moving;

an acquiring unit that acquires a current interval between the first mark and the second mark and calculates an interval difference between the current interval and a predetermined reference interval;

a speed detector that detects a first moving speed that is a moving speed of the transfer belt during a period of time from formation of the mark pattern to detection of the mark pattern, and a second moving speed that is a moving speed of the transfer belt while transferring the toner image to the recording medium;

a calculating unit that calculates a speed difference between the first moving speed and the second moving speed; and a control unit that controls image formation based on the interval difference and the speed difference.

2. The color image forming apparatus according to claim 1, wherein said sensor is a first sensor, and wherein, the transfer belt has a speed mark pattern including a first speed mark and a second speed mark at a predetermined interval, the color image forming apparatus further comprises a second sensor that detects the first speed mark and the second speed mark while the transfer belt is moving and measures a time difference from the detection of the first speed mark until the detection of the second speed mark, and the speed detector detects the first moving speed and the second moving speed based on the interval between the first speed mark and the second speed mark and the time measured by the second sensor.

3. The color image forming apparatus according to claim 2, wherein the transfer belt includes a first area and a second area; and the recording medium is carried on the first area and the speed mark pattern is formed on the second area.

4. The color image forming apparatus according to claim 3, wherein the speed mark pattern includes a repetition of line marks at a specific interval on one edge of the second surface.

5. The color image forming apparatus according to claim 1, wherein the control unit controls a timing of forming the latent image on the image carrier based on the interval difference and the speed difference.

6. The color image forming apparatus according to claim 1, further comprising a driving unit that drives the transfer belt, wherein the driving unit has a rotating part, and the speed detector detects the first moving speed and the second moving speed based on a rotational speed of the rotating part.

7. The color image forming apparatus according to claim 1, wherein the control unit controls the moving speed of the transfer belt based on the interval difference and the speed difference.

8. The color image forming apparatus according to claim 1, wherein the mark pattern includes a group of straight line marks that are perpendicular to an edge of the transfer belt and a group of inclined line marks that are inclined to the edge, and the group of straight line marks includes straight lines formed in magenta, cyan, yellow, and black, and the group of inclined line marks includes straight lines formed in magenta, cyan, yellow, and black.

9. A tandem type color image forming apparatus comprising:

a plurality of electrostatic chargers;

a plurality of image carriers each of which is charged by a corresponding one of the electrostatic chargers;

a plurality of exposing units each of which irradiates a light to a corresponding one of the image carriers to form a latent image on each of the image carriers;

a plurality of developing units each of which develops the latent image on a corresponding one of the image carriers with toner of a specific color to form a toner image of the specific color;

a transfer belt that moves at a specific moving speed to feed a recording medium to the developing unit so that the toner images are transferred to the recording medium;

a pattern forming unit that forms a mark pattern including a first mark and a second mark on the transfer belt using toner;

a sensor that detects the first mark and the second mark while the transfer belt is moving;

an acquiring unit that acquires a current interval between the first mark and the second mark and calculates an interval difference between the current interval and a predetermined reference interval;

a speed detector that detects a first moving speed that is a moving speed of the transfer belt during a period of time from formation of the mark pattern to detection of the mark pattern, and a second moving speed that is a moving speed of the transfer belt while transferring the toner image to the recording medium;

a calculating unit that calculates a speed difference between first moving speed and second moving speed; and a control unit that controls image formation based on the interval difference and the speed difference.

10. The tandem type color image forming apparatus according to claim 9, wherein said sensor is a first sensor, and wherein, the transfer belt has a speed mark pattern including a first speed mark and a second speed mark at a predetermined interval, the color image forming apparatus further comprises a second sensor that detects the first speed mark and the second speed mark while the transfer belt is moving and measures a time difference from the detection of the first speed mark until the detection of the second speed mark, and the speed detector detects the first moving speed and the second moving speed based on the interval between the first speed mark and the second speed mark and the time measured by the second sensor.

11. The tandem type color image forming apparatus according to claim 10, wherein the transfer belt includes a first area and a second area, and the recording medium is carried on the first area and the speed mark pattern is formed on the second area.

12. The tandem type color image forming apparatus according to claim 9, wherein the control unit controls a timing of forming the latent image on each of the image carriers based on the interval difference and the speed difference.

13. The tandem type color image forming apparatus according to claim 9, further comprising a driving unit that drives the transfer belt, wherein the driving unit has a rotating part, and the speed detector detects the moving speed of the transfer belt based on a rotational speed of the rotating part.

14. The tandem type color image forming apparatus according to claim 9, wherein the control unit controls the moving speed of the transfer belt based on the interval difference and the speed difference.

15. A process cartridge that is detachably mounted to a color image forming apparatus, the color image forming apparatus comprising:

an electrostatic charger;

an image carrier that is charged by the electrostatic charger;

an exposing unit that irradiates a light to the image carrier to form a latent image on the image carrier;

a developing unit that develops the latent image with toner of a specific color to form a toner image of the specific color;

a transfer belt that has a speed mark previously formed, and moves at a specific moving speed to feed the recording medium to the developing unit so that the toner images are transferred to the recording medium;

a cleaning unit that cleans the image carrier;

a pattern forming unit that forms a mark pattern including a first mark and a second mark on the transfer belt using toner;

a first sensor that detects the first mark and the second mark while the transfer belt is moving;

an acquiring unit that acquires a current interval between the first mark and the second mark and calculates an interval difference between the current interval and a predetermined reference interval;

a second sensor that detects the speed mark pattern on the transfer belt;

a speed detector that detects a first moving speed that is a moving speed of the transfer belt during a period of time from formation of the mark pattern to detection of the mark pattern, and a second moving speed that is a moving speed of the transfer belt while transferring the toner image to the recording medium;

a calculating unit that calculates a speed difference between the first moving speed and the second moving speed; and a control unit that controls a timing of forming the latent image on the image carrier based on the interval difference and the speed difference, wherein the process cartridge being a combination of the image carrier with at least one from among the electrostatic charger, the developing unit, and the cleaning unit, wherein an image is formed on a region of the image carrier that is out of overlapping with the mark pattern previously formed on the transfer belt.

16. The process cartridge according to claim 15, further comprising a driving unit that drives the transfer belt, wherein the driving unit has a rotating part, and the speed detector detects the first moving speed and the second moving speed based on a rotational speed of the rotating part.

17. The color image forming apparatus according to claim 15, wherein the control unit controls the moving speed of the transfer belt based on the interval difference and the speed difference.

18. The process cartridge according to claim 15, wherein the transfer belt includes a first surface and a second surface, and the recording medium is carried on the first surface and the speed mark pattern is formed on the second surface.

19. The process cartridge according to claim 15, wherein the speed mark pattern is formed on one edge of the transfer belt, and the process cartridge passes over other edge of the transfer belt when the process cartridge is attached to or detached from the color image forming apparatus.

* * * * *